United States Patent
Bourget (10) Patent No.: US 12,084,050 B1
(45) Date of Patent: Sep. 10, 2024

(54) AUTONOMOUS VEHICLES, APPARATUSES, SYSTEMS AND METHODS

(71) Applicant: Anthony J. Bourget, Eau Claire, WI (US)

(72) Inventor: Anthony J. Bourget, Eau Claire, WI (US)

(*) Notice: Subject to any disclaimer, the term of this patent is extended or adjusted under 35 U.S.C. 154(b) by 292 days.

(21) Appl. No.: 17/161,773

(22) Filed: Jan. 29, 2021

Related U.S. Application Data (60) Provisional application No. 62/967,709, filed on Jan. 30, 2020.

(51) Int. Cl.
| | | |
|---|---|---|
| *B60W 30/095* | (2012.01) | |
| *B60W 60/00* | (2020.01) | |
| *B62D 21/15* | (2006.01) | |

(52) U.S. Cl.
CPC .... *B60W 30/0956* (2013.01); *B60W 60/0017* (2020.02); *B60W 60/0024* (2020.02); *B60W 60/00276* (2020.02); *B62D 21/157* (2013.01); *B60W 2540/049* (2020.02); *B60W 2554/4049* (2020.02); *B60W 2556/65* (2020.02)

(58) Field of Classification Search
CPC ......... B60W 30/0956; B60W 60/0017; B60W 60/0024; B60W 60/00276; B60W 2540/049; B60W 2554/4049; B60W 2556/65; B62D 21/157
See application file for complete search history.

(56) References Cited

U.S. PATENT DOCUMENTS

| | | | |
|---|---|---|---|
| 8,118,286 | B2 | 2/2012 | Chong |
| 9,139,199 | B2 | 9/2015 | Harvey |
| 9,298,186 | B2 | 3/2016 | Harvey |
| 9,384,666 | B1 | 7/2016 | Harvey |
| 9,494,943 | B2 | 11/2016 | Harvey |
| 9,645,578 | B2 | 5/2017 | Harvey |
| 9,869,560 | B2 | 1/2018 | Gordon et al. |
| 10,023,231 | B2 | 7/2018 | Ramanujam |
| 11,254,274 | B1* | 2/2022 | Allbee ................... B62D 21/11 |
| 2015/0224845 | A1* | 8/2015 | Anderson ................ F03G 7/08 |
| | | | 701/37 |
| 2017/0038777 | A1 | 2/2017 | Harvey |
| 2018/0186366 | A1* | 7/2018 | Gordon ............... B60W 30/085 |
| 2018/0201138 | A1* | 7/2018 | Yellambalase ....... G05D 1/0055 |

(Continued)

*Primary Examiner* — Peter D Nolan
*Assistant Examiner* — Anwar Mohamed
(74) *Attorney, Agent, or Firm* — Anthony J. Bourget (57) ABSTRACT

Vehicles, systems and methods for improving traffic flow and roadway safety including an autonomous vehicle programmed to automatically interfere with at least a second vehicle in order to protect the second vehicle or occupants or property within the second vehicle. The vehicle includes a Safety Mode where the vehicle sacrifices itself to protect other vehicles, and a Passenger Mode where the vehicle exhibits priority over other vehicles which other vehicles sacrifice themselves for the benefit of the Passenger Mode vehicle. In further disclosure an autonomous vehicle includes crumple zones in non-traditional locations to more effectively protect vehicles in crashes. A computer-implemented method, system, and/or computer program product controls the autonomous vehicle configured to automatically position itself in a collision or interference with another vehicle in order to minimize force impacts upon other vehicles.

5 Claims, 6 Drawing Sheets

(56) References Cited

U.S. PATENT DOCUMENTS

| | | |
|---|---|---|
| 2018/0237005 A1* | 8/2018 | Duan ................. B62D 15/0265 |
| 2018/0299904 A1 | 10/2018 | Harvey |
| 2018/0299905 A1 | 10/2018 | Harvey |
| 2018/0299906 A1 | 10/2018 | Harvey |
| 2018/0307248 A1 | 10/2018 | Harvey |
| 2018/0307249 A1 | 10/2018 | Harvey |
| 2018/0307250 A1 | 10/2018 | Harvey |
| 2018/0307251 A1 | 10/2018 | Harvey |
| 2019/0033862 A1* | 1/2019 | Groden ................. G08G 5/0086 |
| 2019/0114920 A1* | 4/2019 | Hilnbrand .............. G08G 1/166 |
| 2020/0307564 A1* | 10/2020 | Rahimi ........... B60W 30/18163 |
| 2020/0307574 A1* | 10/2020 | Rahimi ................. B60W 30/09 |
| 2020/0334928 A1* | 10/2020 | Bourke ............... G06Q 30/0283 |
| 2021/0138957 A1* | 5/2021 | Peng ................... B60L 15/2045 |
| 2021/0181760 A1* | 6/2021 | Lee ................... B60W 60/0015 |
| 2021/0197860 A1* | 7/2021 | Kwon ............... B60W 60/0015 |
| 2021/0325900 A1* | 10/2021 | Paul ..................... G05D 1/0293 |
| 2022/0126841 A1* | 4/2022 | Kim ...................... B60W 40/09 |
| 2022/0348241 A1* | 11/2022 | Soule ..................... B61L 27/20 |

\* cited by examiner

AUTONOMOUS VEHICLES, APPARATUSES, SYSTEMS AND METHODS

CROSS-REFERENCE TO RELATED APPLICATIONS

This application claims the benefit of and priority to, U.S. Provisional Patent Application Ser. No. 62/967,709 filed Jan. 30, 2020 for AUTONOMOUS VEHICLES, APPARATUSES, SYSTEMS AND METHODS, incorporated herein by reference in its entirety for continuity of disclosure.

BACKGROUND OF THE INVENTION

1. Field of the Invention

The present invention relates to autonomous vehicles, apparatuses, systems and methods of travel and addressing traffic flow and safety.

2. Background Information

In recent years there have been many advances with autonomous vehicles (AVs) and their abilities to self-navigate. While advancements have certain benefits, there is room for improvement.

SUMMARY OF THE INVENTION

Many roadways are overcrowded, resulting in traffic delays and accidents. There is some concern that introducing autonomous vehicles (AVs) to the already overcrowded roadways might make the situation worse. Alternatively, the introduction of AVs might lessen the number of vehicles on the roadway if drivers reduce use of non-AVs. Even if AVs become prevalent, there likely will continue to be use of non-AVs, or at least there will be a transition period where both AVs and non-AVs share the roadways.

Some problems being addressed by AV manufacturers and designers involve how to assure safe navigation on roadways where non-AVs and pedestrians and other users are present (or even in a case where only AVs are occupying the roadways). Also, many traditional drivers are comfortable in their driving abilities and are not yet ready to relinquish control over their driving to an automated system. The lack of control makes passengers uneasy, especially where no person is at the wheel to take corrective action if needed. While such fears may be unfounded given the advances in technology, there is still some apprehension and concern as to whether the technology is up to the task of safely navigating passengers on the roadway. Part of the present invention involves recognizing these problems and apprehensions, and undertaking steps to alleviate them as described.

Heretofore there has been a disincentive for a vehicle to contact or collide with another vehicle or other object. Vehicle are navigated to avoid contact with other vehicles or objects. The present apparatuses, systems and methods, however, are configured to have vehicles collide or purposefully contact other vehicles or objects in order to promote more efficient diving conditions, safety and confidence in use of AVs. AVs under the present invention are programmed to collide or contact other vehicles in order to enhance safety. In further aspects the vehicles or AVs are configured to align themselves in close proximity to promote aerodynamic and travel efficiencies and also escort services. In yet further aspects, the AVs are configured with unique crumple zones and other features not previously utilized so that injuries or damage to some vehicles, passengers and/or cargo or equipment is eliminated or reduced.

In one aspect under the present invention, the foregoing problems may be solved or alleviated by programming the AVs to operate in multiple modes. In a further aspect, the problems may be solved or alleviated by introducing some AVs which are configured entirely as supporting vehicles.

In one aspect an AV is programmed to operate in a dual or multiple mode, including a Passenger Mode and a Supporting Mode. In Passenger Mode, such as where a passenger or special cargo is occupying the AV, the AV will enjoy certain priorities with respect to other vehicles or AVs on the roadway. In Passenger Mode the AV operates differently compared to when in Supporting Mode. In aspects, the Supporting Mode includes various Sub-Modes, including a Crumple Mode, an Aerodynamic Mode, and an Escort Mode. The Crumple Mode causes the AV to sacrifice itself for the benefit of other vehicles or Passenger Mode AVs, such as to reduce the impact upon an AV during a crash, where the Crumple Mode AV positions itself to absorb as much of the force due to a collision in order to lessen harm to a passenger occupant of a Passenger Mode AV, for instance. An AV in Supporting Mode may also clear itself from, or position itself on, a roadway to allow a priority vehicle passage. The Aerodynamic Mode causes the AV to position itself among other vehicles or AVs to enhance driving efficiency, including to reduce overall wind resistance upon traveling vehicles. An Escort Mode causes the AV to position itself (alone or with other vehicles or AVs) to accommodate efficient and safe travel of an AV or non-AV, including surrounding an AV as an escort for protection or to assist in guidance in traffic. Escort Mode AVs may assist other vehicles in merging lanes or general navigation along roadways. AVs in one aspect are programmed to assist non-AVs on the roadways. In further aspects, transportation systems and methods are provided to use the various Passenger Mode and Supporting Mode AVs for overall efficient control of traffic. The use of AVs under the present system may increase overall efficient flow of traffic, and even increase the speed of travel.

In various aspects the invention includes vehicles, computer-implemented methods, systems, and/or computer program products which control AVs. One method aspect includes positioning an autonomous vehicle to purposefully interfere with another vehicle on a roadway. In further aspects, the method includes utilizing an onboard controller to direct the autonomous vehicle to purposefully interfere with travel of the another vehicle. The vehicle may include enhanced crumple zones or energy dissipation mechanisms, including crumple zones and mechanisms in areas where passengers are traditionally positioned.

In a further method aspect the invention includes a computer program product for controlling autonomous vehicles, the computer program product comprising a non-transitory computer readable storage medium having program code embodied therewith, the program code readable and executable by a processor to perform a method comprising directing, utilizing an auto-control hardware system on the autonomous vehicle, the autonomous vehicle to interfere with another vehicle.

A further aspect includes a computer system having a processor, a computer readable memory, and a non-transitory computer readable storage medium, program instructions to direct, utilizing an auto-control hardware system on an autonomous vehicle, the autonomous vehicle to drive to interfere with another vehicle, and wherein the program instructions are stored on the non-transitory computer readable storage medium for execution by one or more processors via the computer readable memory.

A computer-implemented method, system, and/or computer program product controls autonomous vehicles. Program instructions are utilized to position an AV such that it specifically contacts another vehicle.

The above partial summary of the present invention is not intended to describe each illustrated embodiment, aspect, or every implementation of the present invention. The figures and detailed description and claims that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments, aspects and features described. On the contrary, the intention is to cover all modifications, equivalents, and alternatives falling within the spirit and scope of the invention and as defined by the appended claims.

DETAILED DESCRIPTION OF THE INVENTION

Autonomous Vehicles (AVs).

As used herein, an autonomous vehicle (AV) 20 is a vehicle that is at least in part controlled or operated without a human driver directly operating the vehicle. In some instances, an AV 20 drives itself. No person is required to be on board to operate the AV, or if a person is on board, the vehicle drives itself. These autonomous vehicles may drive and park themselves or move cargo between locations without a human operator. There are also varying degrees of autonomy, including some AVs that are at least partially autonomous. For instance, autonomous vehicles as used herein may also include highly assisted driving vehicles and advanced driving assistance systems vehicles. A highly assisted driving vehicle does not completely replace the human operator. The vehicle may perform some driving functions and the person may perform some driving functions. An advanced driving assistance systems vehicle includes one or more partially automated systems in which the vehicle alerts the driver. The features are designed to avoid collisions automatically, provide adaptive cruise control, automate braking or steering adjustments, or parking maneuvers. Some AVs may also be driven in a manual mode where the person exercises control over movement, and the scope of such manual mode or control may vary. An AV 20 in other aspects operates in a Supporting Mode (with no passengers or special cargo or special equipment present in the vehicle) or a Passenger Mode (with at least one person or passenger present, or having special cargo or equipment present). As used herein, a Supporting Mode vehicle may also be designated with the legend SV, and a Passenger Mode vehicle may also be designated with the legend PV and/or Priority Vehicle. In one aspect, AV 20 can switch between SV and PV modes. In some aspects, the AV 20 will operate differently depending on whether it is in a passenger mode or a safety mode. In safety mode the vehicle may operate as a sacrifice vehicle to provide safety to other vehicles.

AV 20 senses a surrounding environment and navigates itself to a destination. AV 20 receives instructions and commands to travel to different locations for purposes of picking up or dropping off passengers or packages, or for maintenance, traffic decongestion, safety and other purposes.

AV 20 may include, but is not limited to, automobiles, trucks, motorcycles, buses, recreational vehicles, motorized carts, scooters, all-terrain vehicles, trains, trolleys, construction equipment or heavy equipment. An AV 20 may include an internal combustion engine that operates using liquid fuels such as gasoline or diesel fuel. Alternatively, AV 20 includes one or more electric motors or inductors that operate using electrical energy stored in batteries. The AV may include solar panels. AV 20 may also include, for instance, a light detection and ranging (LIDAR, laser range finder) system, video cameras, inertial navigation system, accelerometers, radar sensors, ultrasonic sensors, transceiver, global positioning systems, a computing device and other sensors and equipment. Such equipment enables AV 20 to sense and monitor the environment and navigate to the destination with reduced or no user input. AV 20 uses information captured by the various sensors, cameras, etc. to safely drive along a route to a destination, while avoiding obstacles and obeying traffic laws. AV 20 will undertake a series of motion steps to reach its destination. The laser range finder system (LIDAR)) in one aspect is mounted onto an AV 20 and is configured to emit light pulses and measure an amount of time for the light pulses to return to the AV 20 which allows the system to measure the distance of objects surrounding the AV 20.

The AVs 20 are configured in one aspect to automatically position themselves to operate as a safety buffer for traffic. This automatic action is accomplished by configuring, via computer programming, the AV 20 to undertake the automatic action. In some aspects, the AV operates as a client in a server-client environment, or the AV 20 is automatically activated via systems for optimizing traffic flow as presented herein. The systems are computer controlled so the AV 20 receives instruction on how to and/or where to and/or when to move. Movements are made safely and efficiently to comply with driving laws, etiquette and to allow AVs to share roadways and parking facilities with other AVs and non-AVs or vehicles driven by people. In some instances the AV 20 is equipped with crumple zones to lessen the force applied to a protected passenger or priority vehicle PV. In some instances it is advantageous for such AVs 20 to be in contact with a priority vehicle PV to help protect the priority vehicle and its passengers and/or cargo and/or equipment from injury.

Various autonomous vehicle technologies are available for operation and control of the autonomous vehicles AVs 20 of the present invention, including, for instance, technologies for dense parking or transport of AVs (U.S. Pat. Nos. 9,139,199; 9,645,578, and references of record therein), operation of vehicles in special control zones (U.S. Pat. No. 9,298,186, and references of record therein), operation of AVs in groups or convoys (U.S. Pat. Nos. 9,384,666; 9,494,943; US20170038777, and references of record therein), cyclic shuffling for parking (US20180299904, and references of record therein), creating aisle access for AV parking (US20180299905, and references of record therein), coordinating movements of AVs for user exit, loading, or unloading (US20180299906, and references of record therein), mapping to direct AV movement (US20180307248, and references of record therein), maneuvering of AVs for user pick-up (US20180307249, and references of record therein), using pre-computed vehicle locations and paths to direct AV maneuvering (US20180307250, and references of record therein), using zone rules to control AV operation within a zone (US20180307251, and references of record therein), instructing AVs and sending messages to and from AVs from the AVs themselves and/or from mobile devices (U.S. Pat. No. 10,023,231, and references of record therein), responding and redirecting travel in view of emergency vehicles (U.S. Pat. No. 9,869,560, and references of record therein), and technologies for overall efficient flow of AVs for roadway travel and parking. Multiple and/or numerous AVs may be densely positioned and rearranged for travel about roadways as shown.

Figure 1:
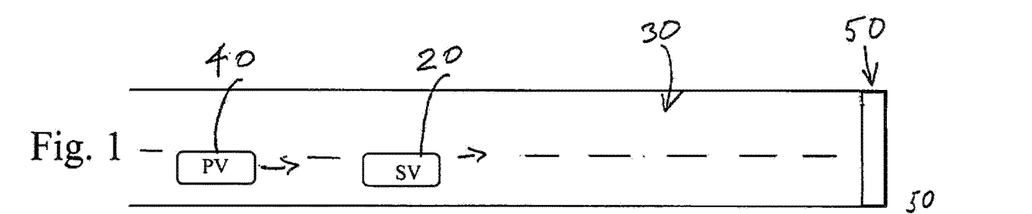
FIG. 1 is a plan view of a roadway upon which is positioned at least one autonomous vehicle in accordance with vehicle, system and method aspects of the present invention.
Figure 2:
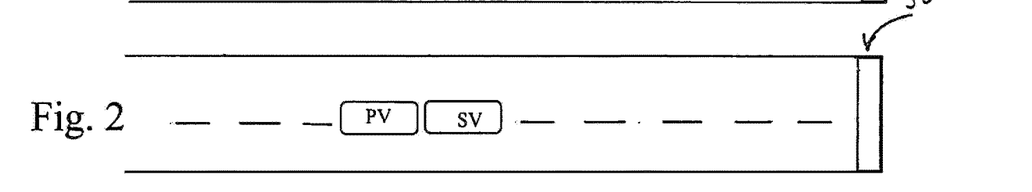
FIG. 2 is a further plan view of the roadway of FIG. 1.
Figure 3:
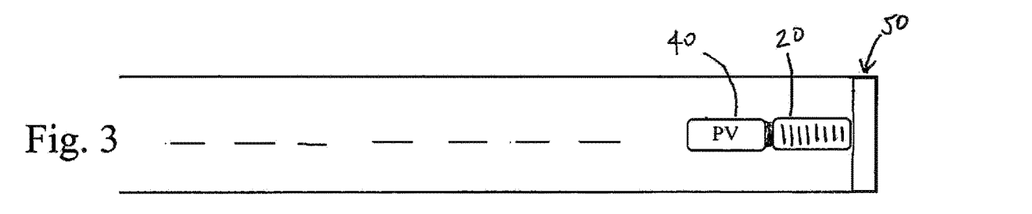
FIG. 3 is a further plan view of the roadway of FIG. 1 showing an autonomous vehicle purposefully colliding with another vehicle.

Referring to FIGS. 1-14, further aspects of the autonomous vehicle, apparatuses, systems and methods are shown. FIG. 1, FIG. 2 and FIG. 3 depict a general scenario in accordance with method aspects of the invention where an autonomous vehicle (AV) 20 travels along a roadway 30 among at least another vehicle 40 or multiple vehicles 40. In some instances the other vehicle 40 is a Priority Vehicle (PV) 40. The AV 20 is configured to automatically position itself to interfere with or contact another vehicle 40 based on a condition of the vehicle 40, a condition of other vehicles, a condition or position of objects 50 or other conditions.

For instance, with reference to FIG. 1, PV40 is traveling in a left to right travel direction along roadway 30 where a hazard 50 is presented. Hazard 50 may include, for instance, a barrier, wall, disabled vehicle, roadway crack, a stopped vehicle (or a line of stopped vehicles), a slowing or breaking vehicle, errant object, icy roadway, or other hazard of driving. The hazard 50 may also be a stationary hazard, a moving hazard, a permanent hazard, a temporary hazard, or a combination of the foregoing. In normal driving conditions, the PV40 might have ample time and distance to slow down, change lanes or otherwise avoid the hazard 50. Yet accidents happen, and accidents happen unexpectedly. So in some cases the PV40 might not have an opportunity to avoid the hazard 50, or there may be some type of error in the operation of PV40 (whether driven autonomously or by a person driver), or the hazard 50 may be another vehicle driven by an inattentive driver or a driver that just makes a mistake or by another autonomous vehicle or there may be a reluctance for a person to occupy a PV40 unless there are enhanced security systems used in the driving environment to provide peace-of-mind or comfort to a passenger. If PV40 does not take corrective action, a collision may or can be expected or predicted. Having PV40 slow down may be sufficient (or such abrupt slow down might cause PV40 to be rear-ended). PV40 may also swerve or take other action in attempts to avoid the hazard 50, which results in collisions with other hazards 50 or other vehicles. SV20 is configured to monitor the environment, including the circumstances of travel of PV40, such as the speed of travel, distance to the hazard 50, rate of change of the hazard 50, if any, stopping capacity, mass or weight of PV40, terrain, elevation changes, road conditions, weather, presence of other vehicles or objects, among other factors that influence the safety of travel along roadway 30. SV20 is configured to assess the safety of the environment and to anticipate, calculate or predict collisions or potential collisions, and to purposefully position itself to collide with a PV (whether the PV runs into the SV, or vice versa). SV20 monitors the environment via sensors and receipt of data which in one aspect is processed via a management system 151 or controller 153 to direct SV20 to move along roadway 30. If SV20 predicts collision with the hazard 50 or even a potential collision with the hazard 50, SV20 is directed to travel in a manner to slow PV40 or otherwise protect PV40, including collide with PV40.

In some cases, vehicle 20 upon contact with a second vehicle may turn to evade oncoming traffic or other objects. Vehicle may include a lock-in mechanism once contacted with a second vehicle so that a vehicle chain is formed. The chain can be guided by a lead vehicle 20 to maneuver through hazards or generally along the roadway. The connected vehicles may release and connect as needed and programmed for efficient travel and safety.

FIG. 2 shows SV20 automatically positioning itself in close proximity to PV40, and in some instances directly contacts PV40. To position itself, the SV20 will slow down to allow the PV to draw closer and/or collide. PV may also be equipped with detection system to monitor the presence of the hazard or potential hazard 50, and may undertake slowing on its own. The presence of SV20 provides added comfort and protection in the event the hazard cannot be avoided. By SV20 positioning itself against PV, PV is protected from significant damage (or greater damage) in the case of an impact collision with the object or hazard 50.

As shown in FIG. 3, SV20 has contacted (including slammed) into the hazard 30, thus absorbing some or potentially a majority of the force that would otherwise have been directed upon PV 40. In one instance SV 20 is configured to collide with hazard 50 prior to PV contacting SV 20. In other instances SV 20 is configured to collide with hazard 50 at the same time as, or nearly the same time as, SV 20 and PV collide. In other instances, SV 20 and PV contact each other (including collide sufficiently to cause activation of a crumple zone aspect of either vehicle) prior to SV 20 contacting hazard 50. As described herein, SV 20 is equipped with crumple zones which reduce the severity of impact that would otherwise be delivered to PV 40. In some cases where the SV 20 lightly contacts PV prior to collision with hazard 50, there may be little or no damage to the PV upon SV contacting the hazard 50. Instead, the crumple zone or crumple zones of SV may absorb all or the bulk of the impact forces. In further aspects, the combined breaking ability of SV 20 while in contact with PV allows for a faster breaking or slowing or stopping of PV. The additional tires of SV 20 in contact with the roadway provide additional friction and stopping action.

Figure 4:
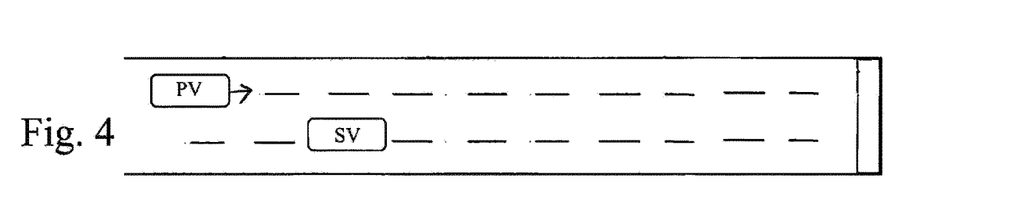
FIG. 4 is a plan view of a roadway upon which is positioned at least one autonomous vehicle in accordance with vehicle, system and method aspects of the present invention.
Figure 5:
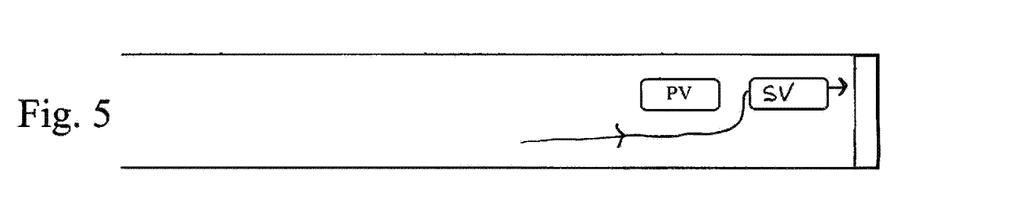
FIG. 5 is a plan view of the roadway of FIG. 4.

FIG. 4 shows a further instance of SV 20 operating in Supporting Mode to protect PV 40. In this example PV 40 and SV 20 are traveling along different lines or lanes of travel upon roadway 30. Upon identifying a hazard 50 or potential hazard 50 and collision, SV 20 is directed to travel in the lane of PV 40 as shown in FIG. 5. In this manner SV 20 will be in a protecting position if and when PV 40 is at risk of contacting hazard 50, and is positioned to absorb the primary impact of a collision as shown in FIG. 3. In other instances an SV may speed up or operate to insert itself in other ways between PV and hazard 50.

SV 20 includes an auto-control hardware system to navigate SV 20 along the roadway. The hardware system includes, for instance, a steering module to steer the vehicle 20, acceleration and braking systems, signaling systems, motor and power drive systems, fuel, whether liquid or electric, batteries and inductors, and other hardware to cause vehicle 20 to effectively and safely travel upon roadway 30. The physical control mechanism of vehicle 20 are configured to allow vehicle 20 to autonomously navigate along the roadway in a safe condition.

In further aspects, autonomous vehicle 20, SV 20, is configured with crumple zones 24. In one aspect, the crumple zones 24 span at least a majority of a total length of the vehicle 20, and in some instances span an entirety of the total length of the vehicle 20. Vehicle 20 in one instance is essentially an autonomous mobile Crumple Car™, designed for primarily protecting other vehicles along the roadway. The vehicle 20 is intended to operate as a buffer to protect other vehicles passengers. Because there need not be a passenger in vehicle 20, the areas of a traditional vehicle reserved for passengers are not required, and instead are configured as crumple zones or with impact reduction features or areas. Further, because passenger space is not used in one aspect, vehicle 20 can be better equipped to focus on the safety of other vehicles, such as PV 40.

Figure 9:
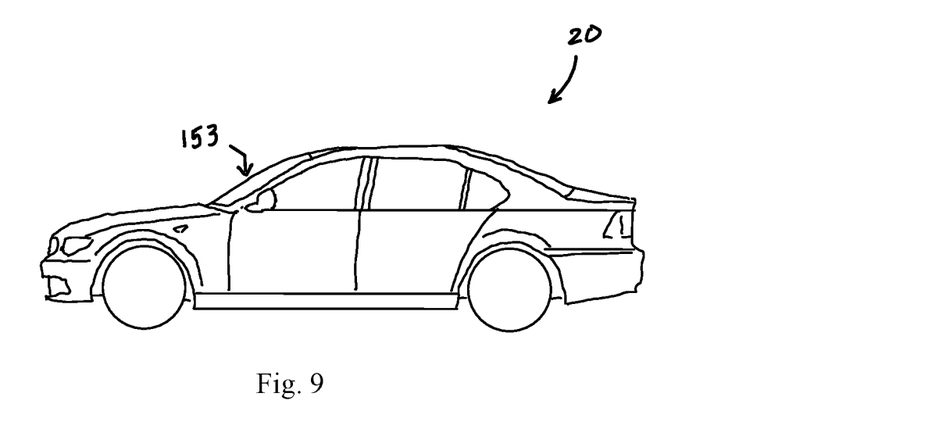
FIG. 9 is a perspective view of an autonomous vehicle in accordance with an aspect of the invention.

FIG. 9 depicts an example of one traditionally shaped vehicle, yet may also be configured with systems for operation as an autonomous vehicle 20. Such vehicle may include a management system 151 or controller 153 so that vehicle 20 operates in a Supporting Mode.

Figure 10:
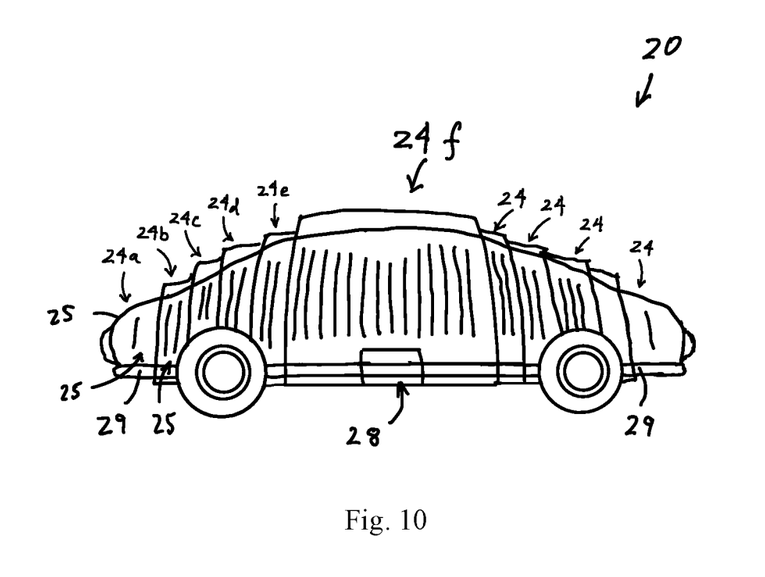
FIG. 10 is a side elevation view of an autonomous vehicle in accordance with one aspect of the invention with portions removed for clarity.

FIG. 10 depicts an autonomous vehicle 20 having a crumple zone 24 or zones in accordance with one aspect of the invention. A crumple zone 24 may be made of traditional structure utilized in typical passenger vehicles. In addition, crumple zones 24 may include structures which would otherwise not be workable with passenger vehicles because in one aspect with vehicle 20, a passenger space is not required, and in some instances is to be avoided. FIG. 10 shows crumple zones 24 spanning an entire length of the vehicle 20. Thus, a greater force dampening opportunity is available with such vehicle during a collision. In one aspect the crumple zones 24 include layers of panels with cross-supports and horizontal and angled structures designed to absorb forces and to bend or crumple to preserve other aspects of the vehicle or to operate as successive force-reducing structures. In further aspects, crumple zones 24 may be presented in nested segments or crumple zones 24*a*, 24*b*, 24*c*, 24*d*, 24*e*, 24*f*, etc. Such segments of crumple zones 24 in one aspect nest within each other. In one instance, a segment 24*b* is designed to stay in position unless and until a prior segment 24*a*, for instance, is compressed. This may be accomplished by configuring the materials and structural design of segment 24*a* to crumple, fold or buckle before segment 24*b* receives on oncoming force. A variety of different designs may be utilized to create a safety vehicle designed to collapse and avoid forces to protect other vehicles on the roadway. Different strengths of metal and other materials may be used to create structures of the crumple zone 24. For instance, softer metals such as magnesium and aluminum are used in areas to allow for crumpling under light forces, whereas ultra high strength steel or extra high strength steel may be used for structures that are to be protected. A variety of mild steel/forming grades, high strength steel and very high strength steel may also be used to provide greater strength to some structural crumple zone segments. In one instance, higher strength steel is used to protect the engine/motor or battery or controller 153 or other components of the vehicle 20 from impacts. In one instance, a protected compartment 28 is constructed of high strength steel and designed to withstand greater forces. The motor and batteries and control systems may be positioned in the protected compartment 28, or surrounded at least in part by very high strength steel, for instance. The protected compartment 28 in one instance is also positioned at a lower area between the front and rear wheels of the vehicle. This positions the heavy components at a relatively low center of gravity to assist in handling of the vehicle 20 and positioning to be less problematic in the event of an accident. Special parts such as batteries, controllers, communications modules, data logs and memory units, motor may be positioned in the protected compartment 28.

In some aspects, horizontal structures 29 are oriented lengthwise (in the general direction of intended travel) to provide impact support and crumple zone assistance. A variety of sheer pins, bolts, plates and other structures are included to provide a layered approach for the crumple zones 24, so that some zones collapse before other zones, and to gradually lessen the transfer of force.

Figure 11:
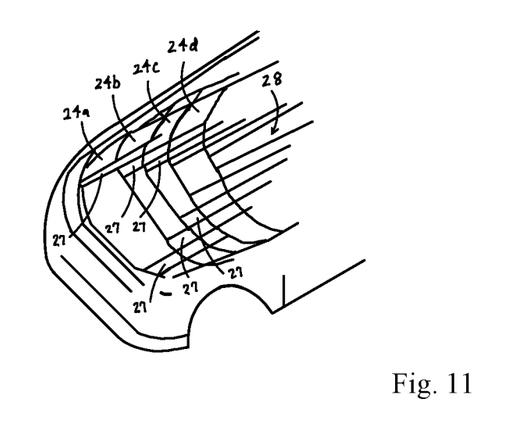
FIG. 11 is a partial perspective of a further autonomous vehicle in accordance with the present invention with portions removed for clarity.

In one aspect as shown in FIG. 11, horizontal structures 29 also include impact energy dissipation devices 27 such as those shown in U.S. Pat. No. 8,118,286 or other systems. Using small sheer elements such as pins to break down high-impact forces may be used for each of the respective segments 24*a*, 24*b*, etc., of the crumple zone 24. For instance, segment 24*a* may include energy dissipation devices 27 independent of energy dissipation devices 27 used in conjunction with adjacent segment 24*b*. In this manner, segment 24*b* will not undergo a collapse until after segment 24*a* has already undergone collapse. The devices shown in U.S. Pat. No. 8,118,286 in one instance are connected to respective segments 24 and nested internally within vehicle 20 for compact placement as shown in FIG. 11. A variety of different sizes and shapes and materials of sheer elements may be used, and the devices 27 constructed, to assure sequential nesting of the crumple zone 24 and respective segment 24a, 24b, etc. A variety of impact energy absorbing mechanisms may be used. For instance, the crumple zone or other impact energy absorbing mechanism may include one from the group of a crush initiator, a hinge, a spring, a shock absorber, a cushion, an airbag, a foam, a filled cylinder (i.e. filled with air or foam or other matter that compresses or is expelled through an exit port. Vehicle 20 is configured to utilize varying degrees of dampening force depending on the circumstances. In some cases a crumple zone of vehicle 20 is designed to selectively crumple a certain distance or deploy airbags or other dampeners as needed. In some cases, where there is a high impact with a passenger vehicle, the safety vehicle 20 will be completely destroyed, but if a high impact occurs with another safety vehicle (or a non-passenger vehicle or non-priority vehicle), it will crumple but save the key parts of the inverter/engine, batteries, etc, while also allowing the other safety vehicle to salvage some key parts unless needed to be completely destroyed to save a third vehicle which is a passenger vehicle.

The crumple zone 24 located at the rearward portion of the vehicle may by symmetrical to the crumple zone 24 located at the forward portion of the vehicle 20. In fact, vehicle 20 in one aspect is configured to travel forward and/or reverse. Positioning the protected compartment 28 at the mid-portion of vehicle 20 provides for symmetrical placement of crumple zones on each end of compartment 28. In further aspects vehicle 20 has a low profile so that drivers or passengers of other vehicles can easily see over vehicle 20. In further aspects horizontal structures 29 are positioned to coincide with horizontal structures of other vehicles for alignment along a similar plane in order to better transfer forces along such structures. In further aspects, vehicle 20 has a short wheel base, i.e., the distance between the front and rear wheels. In further aspects, because the motor is positioned between the front and rear wheels, the space forward of the front wheels and rearward of the rear wheels accommodates a greater volume of crumple zone 24. In further aspects the crumple zone 24 forward of the forward wheels extends a length forward which is much greater than crumple zones on traditional vehicles, and in one aspect the crumple zone 24 extends more than 3 feet forward the forward wheel, and in some aspects extends much greater than 3 feet, including more than 4 feet. Such extended length provides further space for absorbing of impact energy. When vehicle 20 is positioned against a PV40 or other vehicle, the PV40 or other vehicle effectively receives an enhanced crumple zone to lessen impact energy (and injuries) in a collision. Use of vehicles 20 should provide greater peace of mind to passengers of autonomous vehicles and passengers and drivers of non-autonomous vehicles due to the enhanced safety.

As shown in FIG. 10, crumple zone 24, and particularly segment 24f is positioned between front wheels and rear wheels (a position traditionally not utilized for crumple zone due to passenger compartments). In aspects, vehicle 20 is devoid of a passenger compartment, and in further aspects vehicle 20 is constructed so that it is not capable and/or not legally authorized to operate as a passenger vehicle. In further aspects the crumple zone 24 or segments thereof is configured to bend upwards so that collision forces are better dissipated.

In further aspects, segments of crumple zone 24, such as segments 24a, 24b, 24c, etc., are selectively detachable. The segments in one aspect are modular. When a collision is experienced and a segment 24a has been damaged or collapses inward toward segment 24b, segment 24a can be removed, repaired and replaced. A damaged segment may be removed and repaired and then reused. Panel segments 25 of segments 24 in one aspect are bolted to respective devices 27 for ease of removal. In this manner segments 24a (and other segments) may be made of relatively soft and inexpensive and quickly replaced. Thus, vehicles 20 may be commonly used on roadways as safety vehicles to absorb collision impacts that may result, especially when both autonomous and non-autonomous vehicles are in use.

Figure 6:
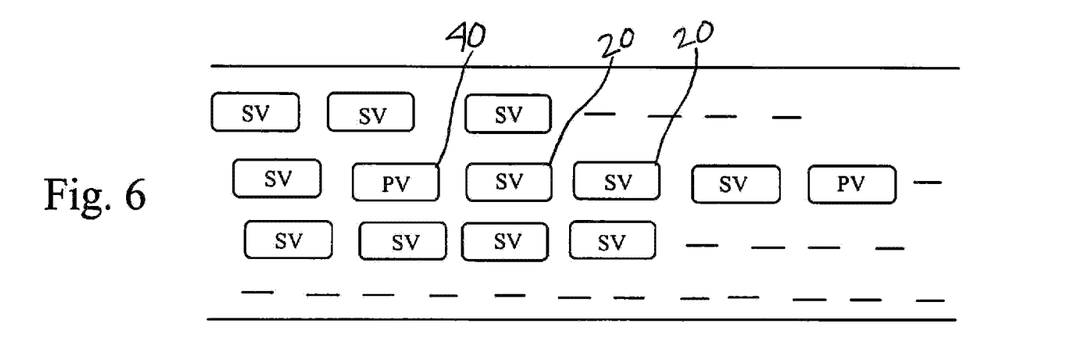
FIG. 6 is a plan view of a roadway upon which is positioned at least one autonomous vehicle in accordance with vehicle, system and method aspects of the present invention.
Figure 7:
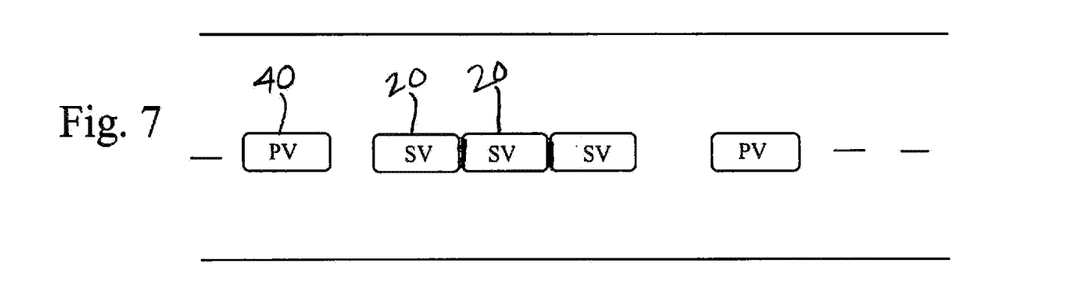
FIG. 7 is a plan view of a roadway upon which is positioned at least one autonomous vehicle in accordance with vehicle, system and method aspects of the present invention.
Figure 8:
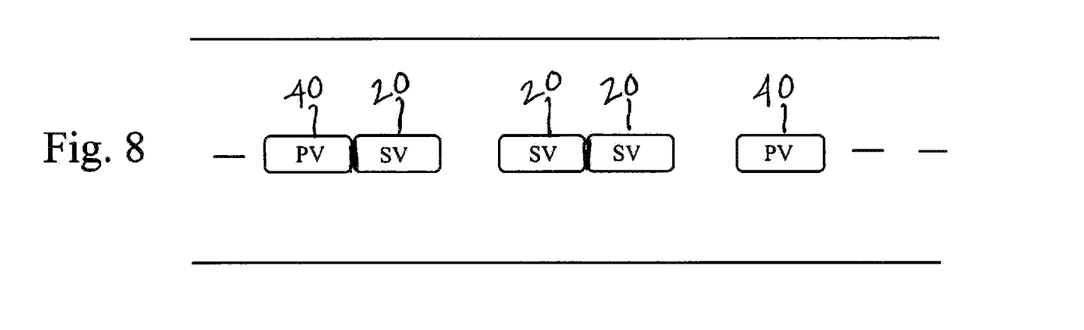
FIG. 8 is a plan view of the roadway of FIG. 7.

FIGS. 6-8 show further aspects of autonomous vehicles 20, 20. Here, vehicles 20 align to provide aerodynamic advantage by traveling in alignment. Vehicles 20, 20 position themselves automatically in closer proximity to each other to lessen wind resistance. Vehicles 20, 20 may also contact each other for efficiency. The linear stacking of vehicles 20, 20 also enhances the overall energy absorbing properties with the additional crumple zones 24 combined. In aspects, the positioning and/or stacking of a vehicle 20 or multiple vehicles 20, 20 allows for a faster travel of all vehicles due to the enhanced safety characteristics. Particularly, all vehicles may travel faster due to the enhanced safety as compared to a situation where vehicles are not accompanied by autonomous vehicles 20, 20. For instance, a greater speed may be used because the presence of vehicles 20 provides enhanced protection against significant collision damages. And if the vehicles 20 are damaged, especially if a supporting vehicle, such vehicle is more easily replaced or repaired, and with less damage (including less personal injury) to thereby reduce overall costs.

Some conditions which cause AV 20 to automatically position itself to contact another vehicle include, for instance, a predicted crash of the priority vehicle 40, a time arrival calculation of when a priority vehicle 40 will arrive at a particular location or will likely contact another vehicle or object but-for the presence of the AV 20, a distance between the priority vehicle 40 and an object, the presence of the priority vehicle 40 at a particular location or staging area, crash avoidance or to lessen severity of a crash, to allow faster travel of vehicles, and allow closer packing of vehicles during travel.

Figure 12:
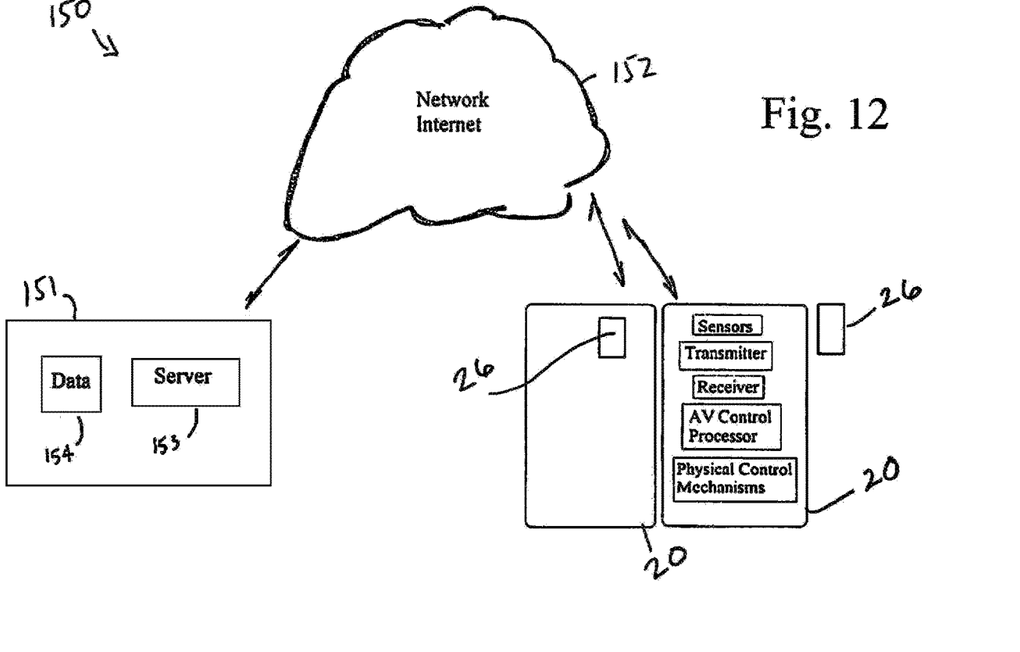
FIG. 12 depicts an autonomous vehicle, systems and computing environment in accordance with further aspects of the present invention.

FIG. 12 illustrates an example system 150 for optimizing traffic flow. System 150 includes a management system 151, one or more autonomous vehicles 20, and a network 152. Additional, different, or fewer components may be provided. For instance, mobile devices 26 (such as a smart phone) and/or computers may be connected to the network 152. Management system 151 includes a server 153 or multiple servers and one or more databases 154. The database 154 may include geographical databases including data pertaining to other vehicles, parking spots, buildings, maps, roadways, for instance, and additional database or databases include data pertaining to AVs, phones 26, users 24, possessors 155, etc.

Figure 13:
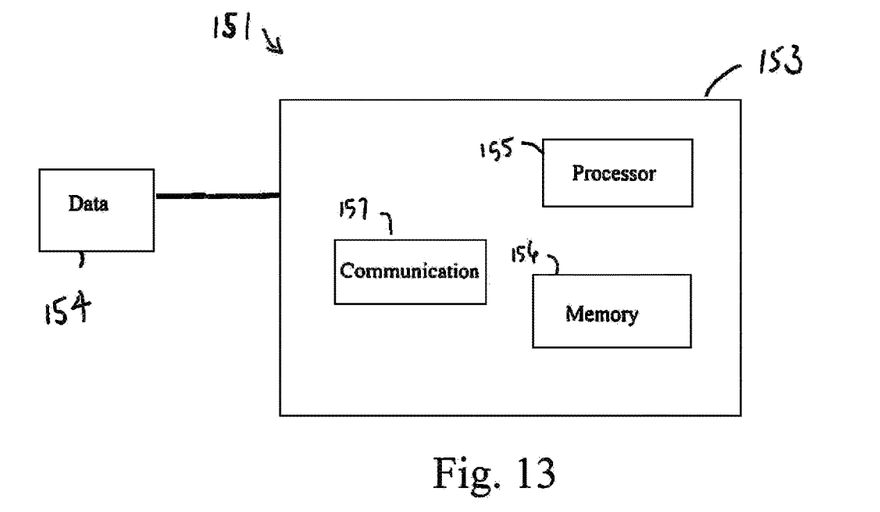
FIG. 13 illustrates an example management system or network device for the autonomous vehicle, system and method aspects of the present invention.

FIG. 13 illustrates an example management system 151 having an example server 153 and in communication with a database 154 or multiple databases. Multiple servers 153 may also be utilized. In this instance server 153 includes a processor 155 and memory 156 and a communications module 157. Database 154 is in communication with server 153. Communications module 157 allows for communication with network 152 which may include cloud computer and/or internet connectivity. The controller 153 in one instance is positioned within AV20.

In further aspects, a passenger's smart phone transforms an AV into a priority vehicle. In a further aspect, the priority vehicle 40 is designated as a priority vehicle due to the nature of an occupant of the AV or vehicle. For instance, a general AV 20 (or even non-autonomous vehicle) that is not currently set as a priority vehicle 40 may become a priority vehicle 20 where an occupant having priority privileges is a passenger or intended passenger of or in the AV 20 or other vehicle. For instance, a person 24 has credentials which automatically transforms (or sets or designates) an AV 20 in which the person is a driver or passenger of a priority vehicle 40. In one aspect the person 24 has a mobile app associated with a smartphone, or a feature of a mobile app associated with a smartphone 26, which sets the AV 20 as a priority vehicle 40. In one aspect the AV 20 is automatically set as a priority vehicle 40 upon the person 24 occupying the AV 20 (or summoning the AV 20). For instance, a code or signal from the person's smart phone 26, or entry or receipt of a signal or code or pin or biometric into or by the AV 20, sets or designates the AV 20 as a priority vehicle 40. Thus, a person having pre-authorized credentials may enjoy a status of having transportation via priority vehicles 40 throughout a facility or facilities of a proprietor 50 or multiple proprietors 50 or along roadways. The credentialed person in one aspect is also given priority over other persons to receive a nearby AV or luxury AV. In one aspect a signal from a smartphone 26 of a passenger 24 is sent by network 152 to server 155. The person having the higher credentials in one instance is paying for the enhanced credentialing. Other methods may be used to provide credentials and/or ranking of passengers. Server 155 in conjunction with database 154 confirms passenger 24 has a priority or is a credentialed person. Server 155 is configured with programming or software to establish priority for the passenger 24 and the AV 20 in which the passenger is located (or to be located). In alternatives, the AV is designated as a priority vehicle or as a supporting vehicle irrespective of a passenger. System 150 is configured to allow priority travel for passengers and priority AV 20. This allows the passenger and AV 20 to travel efficiently and to receive protection from other vehicles or AVs. Particularly, in further aspects AVs 20 are programmed to recognize other vehicles as being Priority Vehicles PV 40 and will automatically operate as Supporting Vehicle SV with respect to a PV. In further aspects, there are degrees of rank for PVs and SVs, where some PVs recognize a higher (or lower) priority for travel as compared to other PVs, and where some SVs recognize a higher (or lower) priority for travel as compared to other SVs. A fully functional SV having high "health" in terms of maintenance history and safety aspects may be designated as having a higher health ranking and priority as compared to an SV that has a lesser maintenance history ratings or safety ratings. SVs having a higher health ranking may be configured to positioned closer PVs compared to SVs having lower health rankings.

Escort Priority

In further aspects, a priority scheme is presented to establish priorities among multiple priority vehicles and/or priority passengers. The relative or respective priorities among priority vehicles and priority passengers in one aspect is set via an interface. Emergency response AVs or emergency response personnel may receive higher priority ranking compared to non-emergency response vehicles or personnel, for instance. Other distinctions for persons may be used to establish priority and tie-breakers between persons and/or AVs of equal priority.

In further aspects the incentive is provided to an owner or proprietor of a vehicle to satisfy a permit requirement imposed by a municipality or other body. For instance, before a permit is granted to an owner of a vehicle 20 or a fleet of vehicles 20 to operate in a municipality, the AVs are programmed to automatically operate as a buffer or in Assist Mode.

Figure 14:
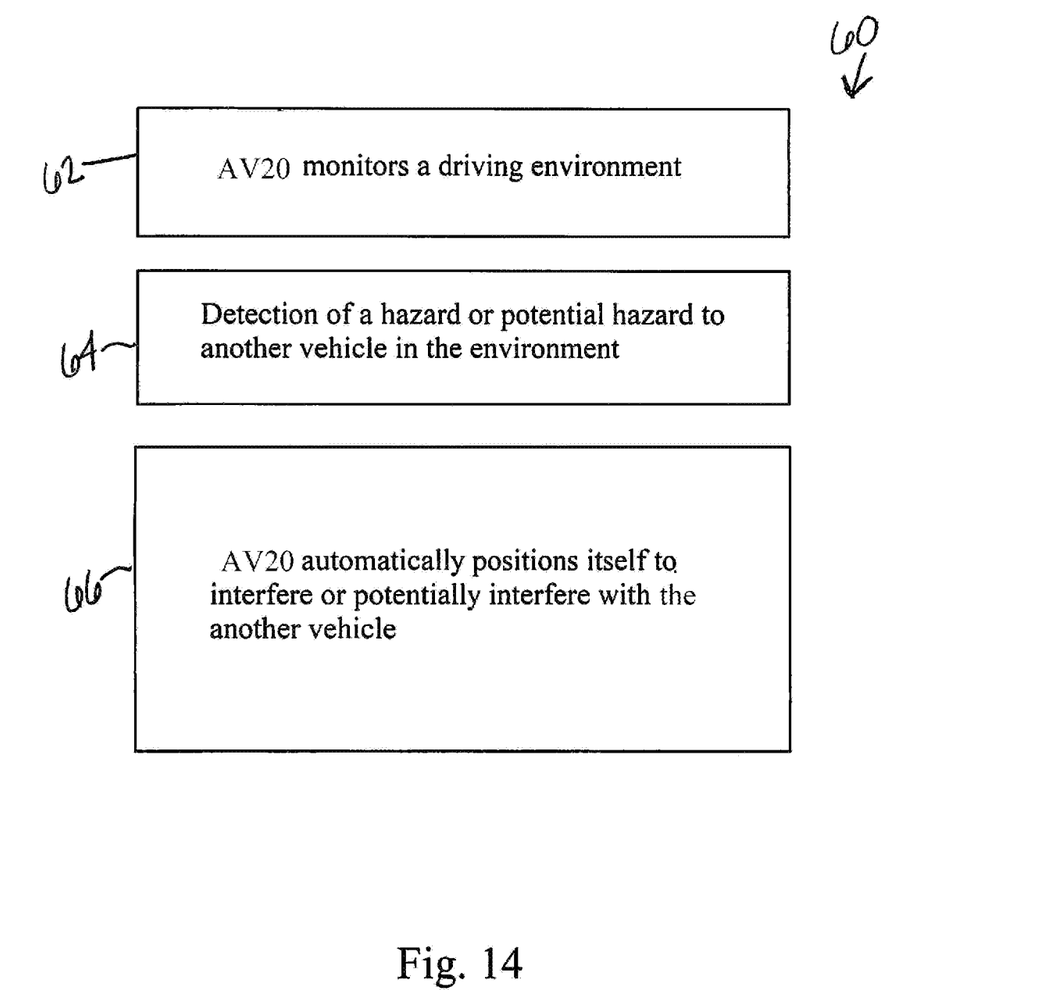
FIG. 14 is a flowchart in accordance with a further aspect of program, device, system and method aspects of the invention.

Further method, system and/or computer product aspects of the invention pertain to AVs which automatically operate to collide with other vehicles, or to otherwise position themselves to be buffers, as presented herein. FIG. 14 is a flow diagram of a method 60 where at step 62 an environment is monitored. In one aspect the AV20 monitors the environment itself. In alternatives, AV40 receives data from another environment monitoring device or systems. At step 64 a hazard 50 or potential hazard to another vehicle in the environment is detected. Step at 66 includes the AV20 automatically positioning itself to interfere or potentially interfere with another vehicle. In aspects, computer software or code is programmed to execute the steps of method 60. The software is present on the AV20 which utilizes physical control mechanisms to navigate vehicle 20. In other aspects, the code or some of the code is located on servers which send signal information to the vehicle 20 for operational control, including signals to direct vehicle 20 to purposefully contact another vehicle. The code and signals may be distributed in a cloud-based environment.

The computer program product of the invention may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to the invention. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative aspects, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be understood, of course, that the foregoing relates to exemplary embodiments of the invention and that modifications may be made without departing from the spirit and scope of the invention as set forth in the following claims.

What is claimed is:

1. An autonomous vehicle, comprising:
a vehicle configured to travel autonomously upon a roadway and having a controller which positions the vehicle to interfere with another vehicle where a mid-section of the vehicle includes a crumple zone configured to absorb an impact energy imparted along a direction of travel of the vehicle.

2. An autonomous vehicle, comprising:
a vehicle configured to travel autonomously upon a roadway and having a controller which positions the vehicle to interfere with another vehicle and having a crumple zone configured to absorb an impact energy, the vehicle devoid of a passenger section.

3. An autonomous vehicle, comprising:
a vehicle configured to travel autonomously upon a roadway and having a controller which positions the vehicle to interfere with another vehicle and having front wheels and rear wheels, a motor to drive the vehicle positioned between the front wheels and the rear wheels, the vehicle configured to absorb an impact energy imparted along a direction of travel of the vehicle, a middle crumple zone positioned between the front wheels and the rear wheels, a forward crumple zone positioned forward of the front wheels, and a rearward crumple zone positioned rearward of the rear wheels.

4. An autonomous vehicle, comprising:
a vehicle configured to travel autonomously upon a roadway and having a controller which directs the vehicle to purposefully interfere with another vehicle where the controller switches between a Passenger Mode and a Supporting Mode where the Supporting Mode causes the autonomous vehicle to position itself to protect another vehicle and the Passenger Mode causes other vehicles to recognize the autonomous vehicle as a priority vehicle to protect the autonomous vehicle.

5. An autonomous vehicle, comprising:
a vehicle configured to travel autonomously upon a roadway and having a controller which directs the vehicle to purposefully contact another vehicle at the same time as or nearly the same time as contacting an object.

* * * * *